United States Patent [19]

Edgar et al.

[11] E Re. 31,267

[45] Reissued Jun. 7, 1983

[54] METHOD FOR THE CONTAINMENT OF OILS AND OIL SLUDGES

[75] Inventors: Allen C. Edgar, Lowell; George N. Smith, Ocala, both of Fla.

[73] Assignee: Mid-Florida Mining Company, Lowell, Fla.

[21] Appl. No.: 243,067

[22] Filed: Mar. 12, 1981

Related U.S. Patent Documents

Reissue of:

[64] Patent No.: 4,144,162
Issued: Mar. 13, 1979
Appl. No.: 829,913
Filed: Sep. 1, 1977

[51] Int. Cl.[3] ..... C10G 17/00

[52] U.S. Cl. ..... 208/13; 106/281 R; 208/183; 252/259.5

[58] Field of Search ..... 208/13

[56] References Cited

U.S. PATENT DOCUMENTS

| | | | |
|---|---|---|---|
| Re. 7,319 | 9/1876 | Lea | 106/281 R |
| 11,269 | 7/1854 | Gengembre | 106/281 R |
| 634,818 | 10/1899 | Hayward | 106/281 R |
| 845,508 | 2/1907 | Bognar et al. | 106/281 R |
| 1,281,354 | 10/1918 | Handy | 208/183 |
| 1,295,308 | 2/1919 | Handy | 208/183 |
| 1,634,514 | 7/1927 | Rial et al. | 208/13 |
| 1,661,731 | 3/1928 | Meston | 208/182 |
| 1,708,488 | 4/1929 | Rosenbaum | 208/182 |
| 1,896,583 | 2/1933 | Hoover | 208/13 |
| 2,045,906 | 6/1936 | Gardner et al. | 106/281 R |
| 2,139,161 | 12/1938 | Hutchins et al. | 106/281 R |
| 3,043,771 | 7/1962 | Bloch | 208/299 |
| 3,098,031 | 7/1963 | Harris | 208/183 |
| 3,527,696 | 9/1970 | Wallover | 208/182 |
| 3,716,474 | 2/1973 | Hess et al. | 208/13 |
| 3,904,512 | 9/1975 | Clark | 208/182 |
| 4,028,240 | 6/1977 | Manchak, Jr. | 208/13 |

*Primary Examiner*—Delbert E. Gantz
*Assistant Examiner*—Olik Chaudhuri
*Attorney, Agent, or Firm*—Duckworth, Allen, Dyer & Pettis

[57] ABSTRACT

A method for the solidification and containment of sludge from an oil reclaiming process to permit environmentally safe storage disposal of the sludge and particularly electric transformer oil containing PCB's. In the process, the sludge or oil is mixed with fuller's earth in a weight ratio of at least 40:60 of fuller's earth to sludge or oil. The fuller's earth has a particle size not greater than −4 mesh to 0 mesh range and a moisture content of less than 12%. [The mixture is allowed to harden to a paste like solid material and conveyed to a conventional land fill storage disposal site.]

7 Claims, No Drawings

METHOD FOR THE CONTAINMENT OF OILS AND OIL SLUDGES

Matter enclosed in heavy brackets [ ] appears in the original patent but forms no part of this reissue specification; matter printed in italics indicates the additions made by reissue.

BACKGROUND OF THE INVENTION

Reclaiming of oil is receiving new emphasis, spurred in large part by the energy crisis and the increased cost of virgin oil. New technologies in reclaiming used oil are being explored. A highlighted survey of the field is given in Science, Vol. 193, No. 4258, pp. 1108–1110, Sept. 17, 1976, published by the American Association for the Advancement of Science.

However, the safe disposal of the unusable components in the reclaiming process, commonly referred to as sludge, remains a serious problem. Past practices of dumping the sludge into waterways and landfill areas have seriously polluted the environment and have posed health hazards to the people directly involved with transporting the sludge. Moreover, it has been recognized that not only are the gross contaminants, acid, fumes, etc., an environmental hazard, but also the release of some ingredients measured in parts per million must be avoided for the protection of the environment. Notable among the minutely present ingredients are the polyhalogenated biphenyls and particularly the polychlorinated biphenyls. Polychlorinated biphenyls, most commonly found in oils used for heat transfer properties, have only recently been recognized as serious pollutants and safe disposal practices must immobilize the polyhalogenated biphenyls and prevent their entry into the environment.

Old conventional oil reclaiming and re-refining processes have typically involved the use of distillation, followed by acid treatment to produce acid sludges (waste) and then clay treatment of the desludged oil. This clay treatment has been typically carried out by naturally bleaching earths such as montmorillonites or attapulgites as produced by Englhard Minerals & Chemicals Co. and the ITT-Floridian Co., and/or with acid-activated bleaching clays as produced typically by Filtrol Co. and Morton Chemical Co.

This process typically may involve percolation filtration using a granular bed of bleaching clay of a size ranging from 6 mesh to 200 mesh but more commonly in the range of −24 mesh to +60 mesh wherein the material to be processed is passed into this fixed bed to obtain the desired results. Alternatively, the contact filtration process is used wherein finely ground and/or air-classified powdered bleaching clay is mixed in typical ratios of 1% to 4% bleaching clay to oil by weight. After agitation, with possible additions of heat over a period of typically 5–20 minutes, this slurry is subsequently passed through filter presses to separate the bleaching clay from the refined oil. This practice is not the same as the present invention. The solid sludge-clay product of the invention is not to be confused with sludge-filters or sludge-clay tailing which contain insufficient clay and are not admixtures. Practitioners in the art of reclaiming oil recognize that clay and acid treatments produce acid sludges and clay sludges which, along with PCB contaminated oils, are difficult to dispose of without creating pollution. This is emphasized in recent U.S. Pat. Nos. 3,625,881 and 4,033,859.

The reclaimed oil and rejected sludge is generally recycled from automotive crankcase oil drainings from internal combustion engines or electric transformers. The oil before reclaiming has many additives such as viscosity index improvers, rust inhibitors, and the like. Decomposed products of such additives and other contaminants such as dirt, foreign metallic particles and carbonaceous matter find their way into the oil. An extensive list of ingredients in oil is given in U.S. Pat. No. 3,919,075. Polychlorinated biphenyls, commonly found as an additive to transformer oils, are particularly serious ingredients in view of the high toxicity per minute quantity. The polychlorinated biphenyls are used generally to enhance the dielectric properties and thermal transfer characteristics of the oil in electric transformers and other associated equipment. One such additive is marketed by Dow Chemical Company under the name DOW-THERM.

Therefore, it remains a serious problem in industry to contain complementary additives and the impurities removed from oil in a manner that is environmentally safe. Heretofore, storage disposal means have not contained the sludge in a safe manner. Commonly, the sludge or PCB contaminated oil has been dumped into holding ponds or landfill areas where the acids, metals, polychlorinated biphenyls, and other impurities can leach into groundwater, float out of the storage area, or be washed into streams with rain and runoff water. Attempts to stabilize the waste with sawdust, peanut hulls, or straw have not been successful for the absorbents do not contain the sludge and are susceptible to floating out of storage areas. These absorbents are also organic in nature and tend to decompose, thus losing their absorbency.

Therefore, it is an object of the present invention to provide a process for the environmentally safe disposal of acid sludges from oil reclaiming processes.

Another object is to provide a process for environmentally safe disposal of any aqueous or non-aqueous sludge from oil reclaiming processes.

Still another object is to provide a process for the environmentally safe disposal of sludge or contaminated oil which renders the sludge or oil immobile in sanitary landfills.

Yet another object of the present invention is to provide an environmentally safe disposal of oil which contains polychlorinated biphenyls.

Still another object of the invention is to provide a sludge or oil containing solid which reduces the risk of health hazard to the workers transporting the solid.

Additional objects and advantages of the present invention will be apparent to those skilled in the art by reference to the following detailed description.

SUMMARY OF THE INVENTION

The process of the invention is directed to the environmentally safe disposal of oil wastes including oils containing polychlorinated biphenyls and sludge from oil reclaiming processes. The process comprises intimately homogeneously mixing the oil wastes with fuller's earth in a weight ratio of 60:40 to 20:80 generally and preferably 55:45 to 45:55. Moreover, the fuller's earth is a particular clay which possesses definite physical characteristics which make possible the rapid adsorbing of the oil wastes. Additionally, limestone, hydrated lime, and/or dolomite may be added to neutralize the acid portion of an acid sludge. The fuller's earth-/limestone/sludge paste-like mixture can readily be transported to landfill areas, holding ponds, or other storage areas. Tests have indicated that there is minimal leaching of polychlorinated biphenyls when the contaminated oils are so treated. In the conventional distillation processes for reclaiming oil, the waste material not distilled may be retained as residue or "bottom" and at least an equal part by weight of particulate fuller's earth added thereto as is convenient. The resultant product is most easily handled if retained in a paste form for on-site storage or for convenient transport to an appropriate landfill.

Fuller's earth is a colloidal clay, hydrated calcium magnesium aluminum silicate, well known for its sorptive properties. It includes highly porous montmorillonites, attapulgites, sepialites, palygorskites, and opalites. Fuller's earth is available from Mid-Florida Mining Company, ITT-Floridian, Englehard Minerals and Chemicals, Oil Dri Corporation, Lowe's, Inc., Excel Minerals, Waverly, Dresser Industries, Mill White, Georgia Tennessee Mining, Wyandotte Chemical Company, Bennett Mineral Company, Balcone Mineral Co., and Absorbent Clay Company.

A preferred fuller's clay comes from deposits found near Emathla in central Florida, and is available from Mid-Florida Mining Company under the designation Emathlite. This fuller's earth has a typical chemical analysis as follows:

| | |
|---|---|
| Silicon Dioxide | 66.8 |
| Aluminum Oxide | 11.5 |
| Calcium Oxide | 6.1 |
| Magnesium Oxide | 5.0 |
| Iron Oxide | 2.9 |
| Potassium Oxide | 1.3 |
| Titanium Oxide | 0.3 |
| Sodium Oxide | 0.2 |
| Ignition Loss at 1220° C. | 5.9 |
| TOTAL | 100.0 |

The free moisture content of dried Emathlite generally is 2% to 6% or the product may be calcined at temperatures of 800° F. to 1500° F. further reducing the water content. The product is available in a wide variety of mesh sizes, from 4 mesh to fine submicron powders. Sizes in the −325 mesh to 0 range are preferred for this invention. It is well known and conventionally accepted by persons conversant with the art that, normally, the finer the particle size of the absorbent, the greater and faster the absorption since more external area of the absorbent particles is exposed to the liquid mixture. The fuller's earths inherently have a high degree of microscopic absorbent pores. As the physical particle size of the fuller's earths products are reduced, the greater the number of pore surfaces is exposed.

In the processing of fuller's earths into commercial products, various sized granular products are produced ranging typically in the following sizes:

−4 to +8 mesh
−8 to +16 mesh
−16 to +30 mesh
−30 to +60 mesh

The resultant fines from the screening of these granules are typically less than 48 mesh and/or −60 mesh and are normally market excess, thus carry lower commercial value than the granular products unless these fines are further processed by fine grinding equipment into powdered grades. These midlings (mid-fines) have good absorbency, light bulk density and have lower market value than the screened granules or ground powders. It is because of this availability and reasonable price that these fines are suggested for waste sludge absorption processes. However, finely ground fuller's earths powder may likewise be used effectively for these purposes.

Calcined Emathlite is capable of absorbing both aqueous and non-aqueous oil wastes. Simply dried Emathlite is primarily used for non-aqueous oil wastes. The fuller's earth will absorb large quantities of liquid and hold this non-aqueous liquid in its internal pore structure by physical means. Additionally, it is commonly known that fuller's earth has certain acid neutralization properties through its high base exchange capacity. The high base exchange capacity, i.e., in the range of 45 m.e.q. per 100 grams, for Emathlite fuller's earth, with similar characteristics present in varying degrees in other fuller's earths, permits the increased neutralization of both caustic and acidic fractions of sludges. The unique combination of this higher ion exchange capacity with ultra fine pore size absorption and high surface area as found in commercial dried and/or calcined fuller's earths offers a particularly high degree of liquid absorption/adsorption. This allows minimum physical storage space while maximizing the amount of liquid which can be absorbed per cubic foot. The high ratio of sludge waste and/or PCB contaminated oil to absorbent stimulates the rapid solidification of this waste while reducing costs of sorbent material. It is further believed that the micropore size typically characteristic of fuller's earths may contribute to the adherence of the sorbate to the sorbent; for example, dry Emathlite fuller's earths have been found to contain 700 square meters of surface area per gram, while ITT-Floridian fuller's earths are reported to contain 200–300 square meters of surface area per gram.

Additional proportions of limestone, hydrated lime, dolomite, or other basic materials may be used along with the fuller's earth to neutralize further the acid portion of the sludge. The amount of lime-type product to be added is dependent on the amount of acid present in the sludge. The lime-type product is preferably of the same relative particulate size as the fuller's earth.

The free water content of the absorbent material, fuller's earth, or fuller's earth and lime-type product should be minimal and should not exceed 12% and preferably less than 6%, since any liquid in the absorbent's pore area reduces its capacity. The fuller's earth typically has a water content of 2 to 6%, while calcined fuller's earth has a water content of less than 2%. The lime-type product may have a water content of 2 to 8%.

The oil waste (PCB contaminated oil and/or sludge) is mixed with the fuller's earth in weight proportions varying from 60:40 to 20:80 of oil waste to fuller's earth, and is preferably 45:55 to 55:45. Limestone or another lime-type product may be added in amounts varying from 10:90 to 100:1 by weight of limestone to acid sludge. The amount of fuller's earth used is not decreased with the addition of limestone. Generally, the amount of lime-type product added is determined by the amount of acid found to be present in the sludge. This is, of course, dependent on the source of the sludge and the type of reclaiming process used on the oil and forms no part of the present invention.

The fuller's earth absorbs and adsorbs the liquid into a solid paste-like mass. The resultant mass may be stored in lesser spaces than used by prior art storages because of the high degree of absorbency of the fuller's earth. Additionally, the high internal pore volume of fuller's earth permits absorption of waste on the interstices of the clay, thus preventing the leaching of sludge or oil, even when the clay combined material is compacted or exposed to ground water. Other low porosity clays such as Kaolin, Halloysite, and Bentonite, as well as other non-clay minerals such as diatomaceous earth, vermiculite, and pearlite will permit rapid leaching over a period of time since the absorption action of these minerals often is a result of external surface area, coupled with large size internal pore diameters which more quickly release entrapped liquids when exposed to ground water.

The invention may be understood by reference to the following non-limiting examples. These examples are designed to teach those skilled in the art how to practice the invention and represent the best mode contemplated for practicing the invention. Unless otherwise specified, all parts and percentages are by weight. All of the following examples are illustrative of the invention.

EXAMPLE 1

Oil sludge from the oil pits designated "White House" in Jacksonville, Fla., which is acid sludge rejected from oil reclaiming are mixed with fuller's earth, Emathlite fines, available from Mid-Florida Mining, in a 50:50 weight ratio. The fuller's earth have a mesh size of −6 to less than 325, and a water content of 2% to 6%. The Emathlite fuller's earths was physically mixed with the oil sludge with a backhoe machine to form a "mashed potato-like paste". The oil sludge alone has a polychlorinated biphenyl content of 5.6 ppm. This paste was subsequently stored above ground water level, leveled, and then covered with 6 inches or dirt.

EXAMPLE 2

Oil sludge from the same source and fuller's earth of the same characteristics as shown in Example 1 are mixed in a weight ratio of 40:60 sludge to fuller's earth. The product became paste like in 30 minutes, less crumbly than the product from Example 1, and easier to handle.

EXAMPLE 3

An acid waste sludge from a mineral oil re-refining plant containing sulfuric acid, and at an approximate temperature of 100° to 120° F. was pumped into a dual mixing screw together with equal quantities by weight of Emathlite fuller's earths having a moisture content of approximately 4% and a particle size of less than 60 mesh to 325 mesh. Approximately 20% by weight of ground limestone was likewise concurrently added to the above mixture, the limestone having a moisture content of approximately 8% and a particle size of −20 mesh to 0 mesh. Mixing of the acid sludge with fuller's earths and limestone created a paste-like solid which readily held both the acid sludge and its odors.

Fumes from the premixed sludge were in evidence prior to the mixing process. This re-refining acid sludge previously had been pumped to tank-like vehicles for hauling to landfill sites. The prior liquid handling system was both hazardous to workers in the area while creating a potential hazard condition during transporting as well as creating potential long-term hazards through the leaching of this acid sludge into the groundwater through the sanitary landfill.

POLYCHLORINATED BIPHENYL TESTS

The sludge used in the above Examples 1 and 2 was analyzed for the polychlorinated biphenyl (PBC) content,which was determined at 5.6 ppm and primarily was Aroclor 1254, a PBC product of Monsanto Chemical Co. The product of Example 2 was submerged in a container of water, covered, and allowed to stand for two months with tests for PCB in the water made at 30 and 60 day intervals. The test was repeated with sludge alone (not representative of the present invention) and with samples prepared as in Example 2 but having additional Aroclor 1254 added thereto to produce products with 10 ppm PCB and 100 ppm respectively. The PCB levels of the water after 30 and 60 days is shown in Table I.

TABLE I

| | 30 day PCB levels | 60 day PCB levels |
|---|---|---|
| Sludge alone (PCB content 5.6 ppm) | 0.17 ppm | 0.20 ppm |
| Product of Example 2 (PCB content of 5.6 ppm) | <.01 ppm | <.01 ppm |
| Product of Example 2 (PCB content 10 ppm) | <.01 ppm | <.01 ppm |
| Product of Example 2 (PCB content 100 ppm) | <.01 ppm | .02 ppm |

A sample of waste electric transformer oil having a high concentration of PCB's was obtained. 200 grams of this oil was mixed with 3000 grams of water and allowed to stand for 30 days. The water was found to contain 21 ppm PCB's at the end of the 30 day period.

200 grams of this same waste oil was mixed with each of the fuller's earths listed in the following table in a weight proportion of 40:60 oil to fuller's earth. The oil-fuller's earth paste-like mixture was then immersed in 3000 grams of water for 30 days and shaken daily. The following table shows the measured PCB's in the water at the end of the 30 day period.

| Size | Fuller's earth Source | Moisture content of fuller's earth | PCB content of water after 30 days |
|---|---|---|---|
| −60 to 0 | Emathlite | 2% to 6% | 7.5 ppm |
| −24 to +48 | Emathlite | 2% to 6% | 8.1 ppm |
| −24 to +48 | Emathlite | Less than 2% | 7.8 ppm |
| −24 to +48 | S. Carolina | 2% to 6% | 4.8 ppm |
| −24 to +48 | Illinois | 2% to 6% | 3.1 ppm |
| −24 to +48 | S. Carolina | Less than 2% | 5.7 ppm |
| −24 to +48 | Missouri | Less than 2% | 4.1 ppm |

Although the invention has been described in considerable detail with reference to certain preferred embodiments thereof, it will be understood that variations and modifications can be effected within the spirit and scope of the invention as described above and as defined in the appended claims.

What is claimed is:

1. A method for the solidification and containment of oil waste to permit environmentally safe storage disposal comprising the steps of:

homogenously mixing the oil waste with particulate fuller's earth having a particle size in the −6 to 0 mesh range and a free moisture content of 2 to 6% in a weight ratio of at least 40:60 fuller's earth to oil waste to form an intimate mixture of oil waste and fuller's earth, *and* allowing the intimate mixture to harden to a paste-like consistency. [and conveying the mixture to a storage disposal sight.]

2. A method of claim 1 wherein in addition to the oil waste and fuller's earth an acid neutralizing agent selected from the group consisting of limestone, hydrated lime, and dolomite is added to the mixture.

3. The method of claim 2 wherein the oil waste being treated is an acid sludge from a re-refining process.

4. The method of claim 1 wherein the fuller's earth is calcined at a temperature of between 800° F. and 1500° F. before mixing it with the oil waste.

5. The method of claim 1 wherein the oil waste being treated is an oil containing polyhalogenated biphenyls.

6. A method for the solidification and containment of oil waste remaining from a re-refining process to permit environmentally safe storage disposal comprising the steps of: homogeneously mixing the oil waste with particulate fuller's earth having a particle size in the −60 to 0 mesh range and a free moisture content of 2 to 6% in a weight ratio of at least 40:60 fuller's earth to oil waste to form an intimate mixture of oil waste and fuller's earth, *and* allowing the intimate mixture to harden for about thirty minutes to a paste-like consistency. [and conveying the mixture to a storage disposal site.]

*7. A method according to claim 1, 2, 3, 4, 5 or 6 further comprising the step of conveying the mixture to a storage disposal site.*

* * * * *